United States Patent [19]

Zimmerman

[11] 4,180,945

[45] Jan. 1, 1980

[54] HONING MACHINE

[76] Inventor: Philip R. Zimmerman, 295 Berkeley Pk. Blvd., Kensington, Calif. 94707

[21] Appl. No.: 847,830

[22] Filed: Nov. 2, 1977

[51] Int. Cl.² .................. B24B 33/02; B23B 47/00
[52] U.S. Cl. ............................. 51/34 C; 408/234
[58] Field of Search .................. 51/34 C, 34 G, 34 H, 51/34 R, 34 BR, 34 D, 34 E, 34 F; 408/234; 248/182; 173/162, 163

[56] References Cited

U.S. PATENT DOCUMENTS

| 1,779,161 | 10/1930 | Douglas | 51/34 C |
|---|---|---|---|
| 1,845,069 | 2/1932 | Zimmerman | 51/34 C |
| 2,372,088 | 3/1945 | Kaveny | 51/34 C |
| 2,519,542 | 9/1950 | Carey et al. | 51/34 H |
| 2,533,957 | 12/1950 | Roelfs | 173/163 |
| 2,746,720 | 5/1956 | Cannon | 173/163 |
| 3,434,242 | 3/1969 | Corey | 51/34 R |

FOREIGN PATENT DOCUMENTS

| 799321 | 8/1958 | United Kingdom | 51/34 R |
| 2604602 | 8/1977 | Fed. Rep. of Germany | 51/34 H |

Primary Examiner—Nicholas P. Godici
Assistant Examiner—K. Bradford Adolphson
Attorney, Agent, or Firm—Fitch, Even & Tabin

[57] ABSTRACT

A honing machine for close tolerance sizing of a cylindrical bore in a work piece such as an internal combustion engine block includes a table for supporting the work piece with its cylindrical bore in vertical alignment and a vertical tower structure spanning the table and supporting a trolley for reciprocal movement motor means for driving the honing head being suspended from the trolley by a gimbal mounting. The honing machine is preferably adapted for manual operation, a manual lever and adjustable fulcrum being interconnected together between the vertical tower and trolley for controlling the reciprocating stroke of the honing head, and adjustable stop limiting the downward stroke of the honing head with the weight of the trolley, motor and honing head being counterbalanced to facilitate reciprocating movement of the honing head.

10 Claims, 5 Drawing Figures

HONING MACHINE

BACKGROUND OF THE INVENTION

The present invention relates to a honing machine and more particularly to a honing machine adapted for vertical reciprocation of a rotatable honing head within the cylindrical bore of a work piece.

The honing machine of the present invention is particularly contemplated for fine tolerance sizing or more specifically for resizing of cylindrical bores in engine blocks and the like. The construction or reconditioning of engine blocks requires close tolerance sizing of the piston cylinders, valve guide-bores and the like. These cylindrical bores are commonly formed from specially formulated cast iron which is difficult to size or machine but which tends to maintain close tolerance sizing over long periods of operation. Special care must also be taken to prevent the development of microscopic cracks or flaws within the resized bore. Accordingly the bores are commonly sized by passing a rotating honing head along the axis of the bore. The honing head includes peripherally mounted cutting elements, preferably stones, arranged to uniformly engage and hone the cylindrical surface. The cutting stones are commonly of an elongated configuration and are arranged parallel with the axis of the bore. As the honing head is reciprocally passed through the cylindrical bore, the rotating stone cutters tend to form a uniform cylindrical dimension along the length of the bore.

It is common practice to initially remove excess metal from the cylindrical bore by other means such as a boring mill. Such a rough cut may initially size the cylindrical bore to within less than 0.005 inches of its final dimension. Preferably, the bore is initially sized to within approximately 0.001–0.002 inches of its final dimension. Following this rough dimensioning of the cylindrical bore, it may then be finally sized by the present honing machine to produce a close tolerance dimension within the cylindrical bore while maintaining continuity of that surface.

It has also been known that cutting operations accomplished by honing machines of the type set forth herein may be improved through the use of cutting or honing fluids which are directed onto the honing head as it operates within the cylindrical bore. The fluid serves as a cooling medium and additionally carries away metal particles which are removed form the cylindrical bore by the honing head. This assures that the cutting stones remain in proper engagement with the surface of the cylindrical bore.

In the past, it has been common practice to employ honing machines including complex and expensive machinery for supporting a work piece such as an engine block and for reciprocally operating the rotating honing head. The complexity of such honing machines has increased their difficulty of operation. For example, with many honing machines of the type employed in the prior art, access to the area of the honing head tends to be limited because of the surrounding structure of the machine. Accordingly, it has been difficult to intially position or reposition relatively heavy work pieces such as engine blocks upon the honing machines. Still further, the controls for prior art honing machines have been relatively complex, thus adding to the degree of expertise necessary for operating the machine and increasing the amount of time for satisfactorily accomplishing a honing operation.

Accordingly, there has been found to remain a need for a simple yet reliable honing machine to size cylindrical bores in work pieces such as engine blocks and the like.

SUMMARY OF THE INVENTION

It is therefore an object of the invention to provide a simple, reliable honing machine for facilitating operation of a rotatable and axially reciprocal honing head within the cylindrical bore of a work piece.

In accomplishing this general object, one aspect of the present invention particularly contemplates a table means for supporting the work piece and a vertical column including two vertical rails on opposite sides of the table with a cross-piece spanning the rails substantially above the table, a trolley being arranged for vertical movement upon the vertical rails with gimbal means supporting the honing head. In this manner, an open passthrough is formed above the table to facilitate initial arrangement and repositioning of a work piece.

Another particular aspect of the invention contemplates use of a table for supporting the work piece with a vertical column extending above the table and supporting a trolley for vertical reciprocating movement, a motor being secured to the trolley by a gimbal mounting, the motor being of a type including a chuck for connection with a shaft of the honing head. This combination of features particularly facilitates operation of the honing machine as will be made apparent in the following description. Initially the combination of the vertical column, trolley and gimbal mounting for the motor is particularly effective in resisting or absorbing the high torque forces developed by operation of the honing head. The trolley, motor and honing head may be moved in vertical reciprocation by a lever interconnected between the trolley and vertical column. An adjustable fulcrum, in combination with the lever, adjusts the stroke of the honing head in relation to operation of the lever. An adjustable stop assembly interconnected between the vertical column and the trolley effectively limits the stroke of the honing head. Finally, the invention particularly contemplates use of means for dispensing honing fluid upon the honing head while it is operating within the cylindrical bore of the work piece, the table preferably including means for collecting the honing fluid and recycling it if desired.

Additional objects and advantages of the invention are made apparent in the following description having reference to the accompanying drawings.

DESCRIPTION OF THE PREFERRED EMBODIMENT

Figure 1:
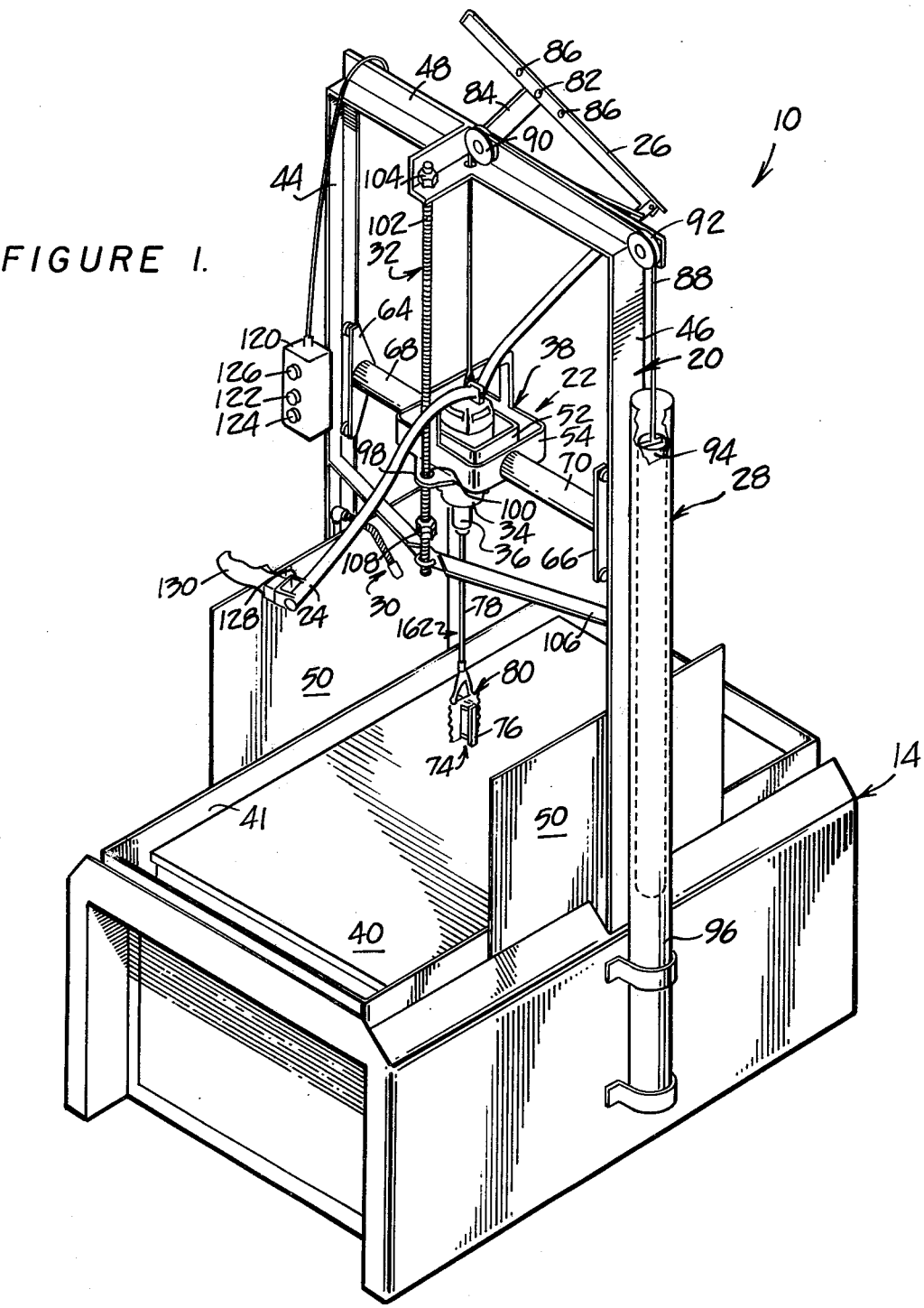
FIG. 1 is a perspective view of a honing machine contructed according to the present invention.
Figure 3:
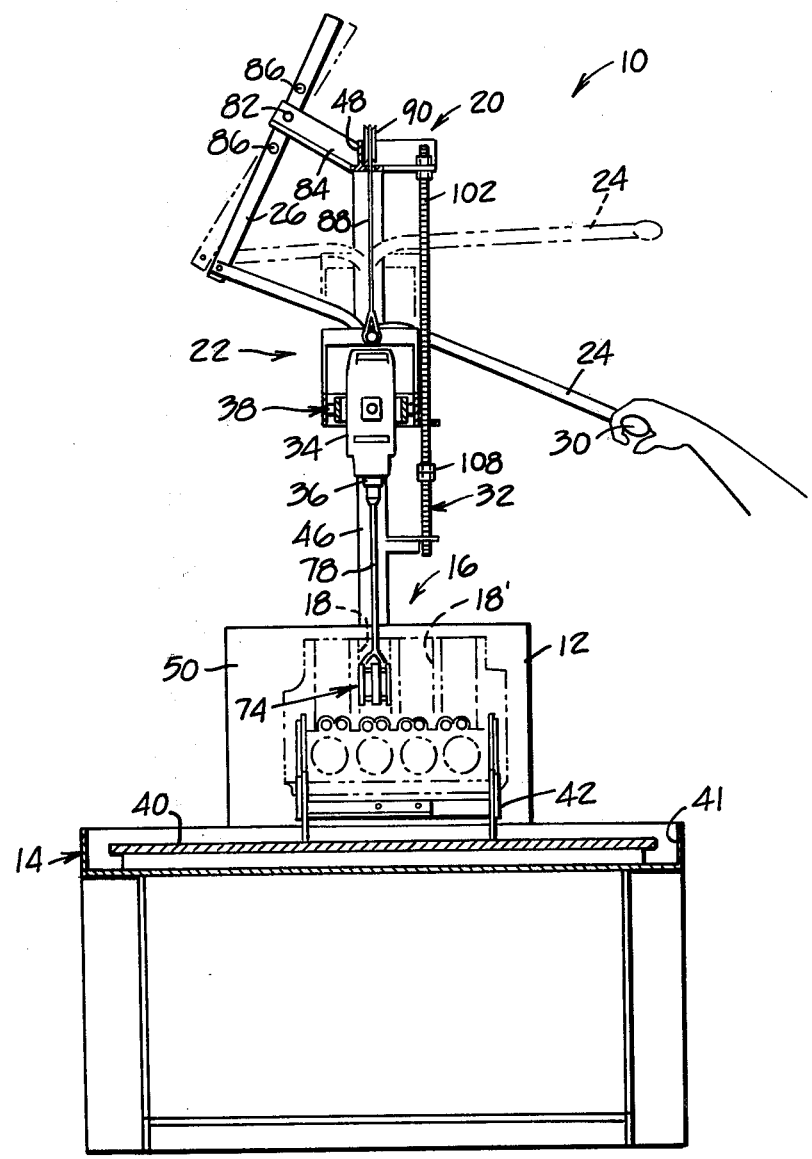
FIG. 3 is a partially schematic side view in elevation of the honing machine of FIG. 1 with portions of the supporting structure of the machine being removed to better illustrate the manner in which the honing head is suspended within a cylindrical bore of an engine block as the work piece.

Referring now to the drawings, the honing machine of the present invention is generally indicated at 10 and may be best seen in its entirety in FIGS. 1 and 3. The honing machine 10 is of a type designed to support a work piece 12 upon a suitable support surface such as the table 14. A honing head assembly 16, adapted for rotatable operation, is suspended in alignment with a cylindrical bore 18 in the work piece. The rotating honing head is then moved reciprocally through the cylindrical bore in order to remove material from the bore and accomplish fine tolerance sizing therein.

Within the present invention, the honing head is supported by means of a vertical column structure 20 which extends above the table 14. The honing head is supported by means of a trolley assembly 22 which is arranged for reciprocating vertical movement upon the column structure 20.

The column structure 20 forms an open passthrough upon the table and thereby facilitates operator access for positioning a work piece such as an engine block upon the table in appropriate alignment with the honing head.

To simplify operation of the honing machine 10, reciprocating movement of the trolley assembly 22 and the honing head 16 is preferably accomplished by means of a lever 24. Operation of the lever is made especially simple and versatile by its combination with a variable fulcrum element 26. To further facilitate manual control over reciprocating movement of the trolley and honing head, a counterbalance 28 is provided to offset the weight of those components.

A number of other features of the honing machine 10 will be apparent from the following description. For example, the invention contemplates the use of means such as the nozzle 30 for directing honing fluid onto the honing head while it is operating within the cylindrical bore 18 of the work piece. As will be described below, the table 14 is adapted to collect the honing fluid and recycle it if desired. Finally, controls for regulating rotating speed of the honing head as well as the rate of flow for the honing fluid are readily accessible for an operator so that he may initiate or adjust those functions while also controlling reciprocating movement of the rotatable honing head by means of the lever 24.

During operation of the honing machine, the lower stroke limit of the honing head is closely controlled by means of a variable stop assembly generally indicated at 32. The upper stroke limit of the honing head could be similarly controlled, if desired.

Before proceeding with a more detailed description of the honing machine, it is further noted that construction and operation of the honing machine is particularly simplified by employing motor means such as the electric motor 34 for driving the honing head in rotation. The electric motor includes a chuck assembly 36 for securing and suspending the honing head in alignment with the cylindrical bore of the work piece. The motor 34 itself is suspended from the trolley assembly 22 by means of a gimbal mounting 38. Through this combination, the design of the honing head may be particularly simplified while maintaining its reliability of operation and facilitating operator control over the honing machine. In addition, the combination of the vertical column and the gimbal mounting for the motor is especially effective to absorb or transfer high torque forces developed by interaction of the honing head within the work piece bore.

Figure 2:
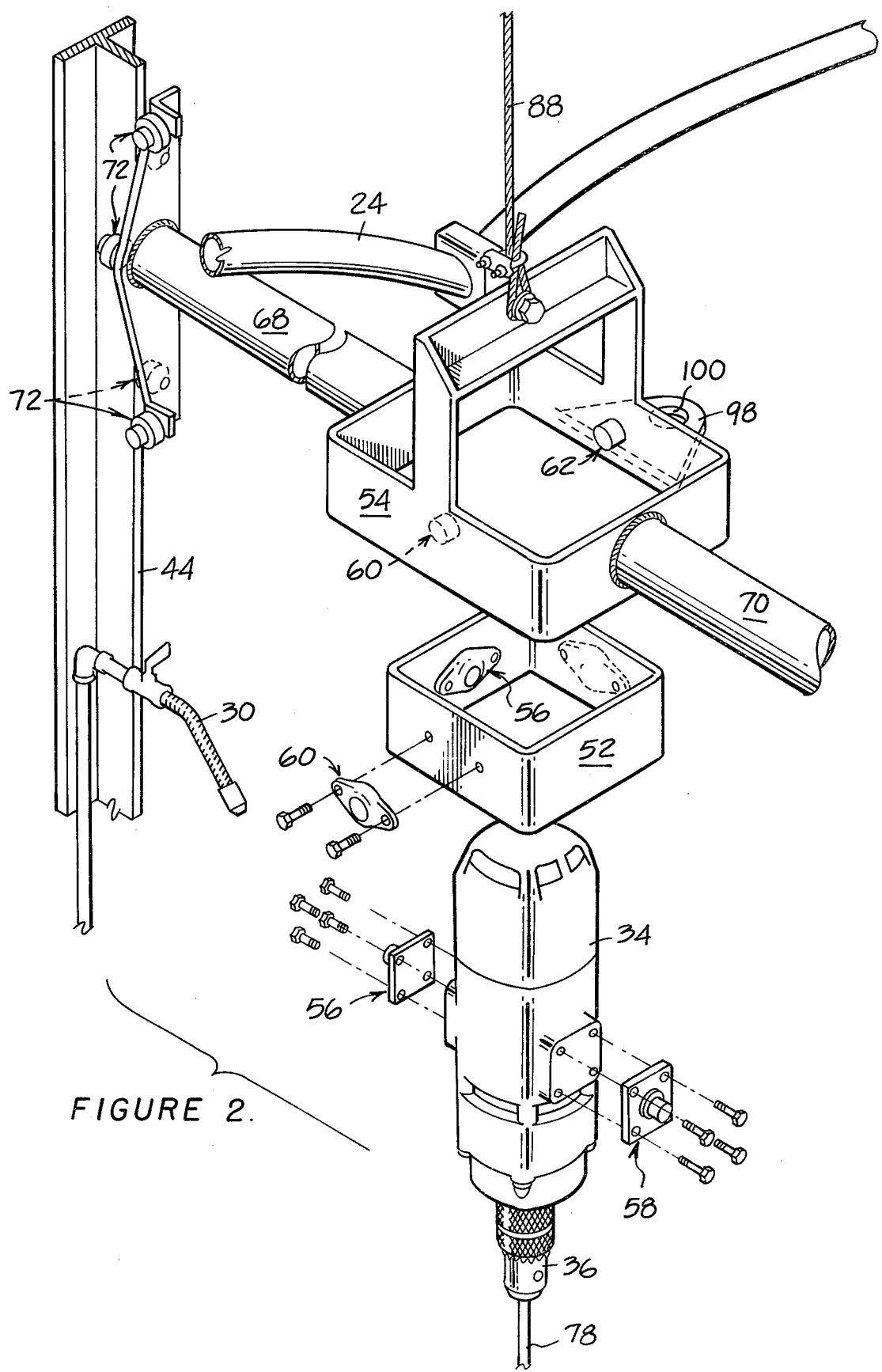
FIG. 2 is an exploded fragmentary view of a trolley assembly mounted upon spaced apart rails of a vertical tower structure for suspending a honing head in alignment with a cylindrical bore in a work piece.

To describe the honing machine 10 in greater detail, its overall configuration may be best seen in FIGS. 1 and 3. Referring to those figures, the table 14 includes a flat structural plate 40 upon which the work piece 12 is arranged. Referring particularly to FIG. 3, a special jig 42 is employed to support the work piece with the cylindrical bore 18 in vertical alignment with the reciprocating stroke of the honing head 16. The nozzle 30 extends above the table in order to direct honing fluid upon the honing head while it is within the cylindrical bore 18. The nozzle 30 is illustrated for example in FIGS. 1 and 2. Operation of the honing head within the cylindrical bore may be best seen in FIG. 3.

The table 14 is adapted to collect honing fluid after it passes the honing head. For this purpose, the table 14 includes a shallow collecting tray 41 surrounding the plate 40 in order to receive the honing fluid. Means within the table (not otherwise shown) receive the collected honing fluid from the tray 41 and recycle it to the nozzle 30 through an appropriate pump (also not shown).

The vertical column structure 20 is preferably formed in the shape of an inverted U in order to form an open passthrough above the table surface 40 to facilitate operator positioning of the work piece or engine block 12 thereupon. The column includes two vertical T-bars 44 and 46 secured to the table 14 and to each other by cross braces (not shown) beneath the plate 40 and tray 41 of the table. The upper ends of the T-bars are interconnected by means of a crosspiece 48 also formed from T-shaped stock. As may be best seen in FIG. 1, removable splash guards 50 are mounted adjacent each of the vertical T-bars 44 and 46 to prevent splashing of honing fluid and assure its collection by the tray 41 of the table.

The trolley assembly 22 includes a gimbal mounting 38 as was noted above. The gimbal mounting 38 is formed by a pair of nested collars 52 and 54 which provide transverse pivot axes for the motor 34. In this regard, having particular reference to FIG. 2, the inner gimbal collar 52 supports the motor 34 by means of trunnion assemblies 56 and 58. A transverse pivot axis is formed between the gimbal collars 52 and 54 by means of additional trunnion assemblies 60 and 62. The outer gimbal collar 54 is supported for vertical reciprocating movement upon the column structure 20 by means of roller mountings 64 and 66 which are secured to support tubes 68 and 70 extending from opposite sides of the collar 54. Each of the mountings 64 and 66 supports a plurality of sealed ball bearing roller units 72 arranged for respective interaction with one of the T-bars 44 and 46. The trunnion assemblies 56–62 are also preferably sealed ball bearing pillow blocks to assure freedom of movement for the motor 34 and honing head during operation of the honing machine.

Within the trolley assembly it is important to note that the honing head assembly 16 is of generally conventional design and includes a head structure 74 supporting a plurality of honing stones, one of which is indicated at 76. The honing stones 76 are circumferentially spaced and are parallel with the axis of the honing head. The honing head further includes conventional means (not shown) for adjusting the radial spacing of the stone in order to determine the diameter to which the cylindrical bore of the work piece is to be sized. The head structure 74 of the honing head assembly is also suspended from a shaft 78 by means of a gimbal mounting 80. The gimbal mounting 80 is of conventional construction for such honing head assemblies comprising a biaxial pivot mounting for the honing head upon the shaft 78. This gimbal mounting in combination with the gimbal mounting 38 upon the trolley permits the honing head to remain in precise alignment with the axis of the cylindrical bore 18 during operation of the honing machine. The shaft 78 for the honing head is secured by the chuck assembly 36 of the motor 34. The motor 34 also includes suitable reduction gearing in order to drive the chuck and honing head in a proper rotating speed range.

Reciprocating motion of the trolley, motor 34 and honing head 16 is regulated by means of the lever 24 and variable fulcurm element bar 26 as was indicated above. These two elements are interconnected with each other between the trolley assembly 22 and crosspiece 48 of the vertical column. The variable fulcrum bar 26 is pivotably connected at 82 to a fixed extension 84 of the crosspiece 48. The variable fulcrum bar is formed with a number of mounting holes such as those indicated at 86 in order to adjust the effective fulcrum for the lever 24 and to thereby vary the effective stroke for the honing head 16. Thus, the fulcrum bar 26 may be adjusted in order to facilitate manual stroking of the honing head or to vary the vertical stroke of the honing head in different applications. A central portion of the lever 24 is pivotably connected at 86 with the trolley assembly. The lever 24 is also shaped to prevent interference between the lever and the motor or gimbal mounting during vertical travel of the trolley. The shape of the handle is also selected to facilitate operation by persons of different heights.

To further facilitate manual reciprocating operation of the trolley and honing head, the weight of the trolley, motor 34 and honing head 16 is offset by means of the counterbalance assembly indicated at 28. The counterbalance assembly 28 includes a flexible line 88 secured to the trolley and trained over sheaves 90 and 92 on the crosspiece 48 for connection with a variable weight 94. The variable weight 94 is preferably provided by means of a cylindrical element which is open at the top and closed at the bottom so that it may be filled with varying amounts of sand or the like in order to exactly balance the weight of the components listed above. The cylindrical weight 94 is suspended within a protective housing or fender 96.

The variable stop for limiting the stroke of the honing head includes a tab 98 extending outwardly from the outer collar 54 of the gimbal mounting 38. The tab 98 forms an opening 100 for receiving a threaded shaft 102 which is secured or fixed at 104 to the crosspiece 48. The shaft 102 freely passes through the opening 100. The lower end of the shaft 102 is also preferably fixed relative to the vertical column by means of a bracket 106. Through this arrangement, the stroking limits of the honing head may be readily controlled by locking nuts 108 upon the shaft 102. The pair of locking nuts 108 illustrated in FIG. 1 sets the lower limit for the stroke of the honing head. However, it is readily apparent that an additional set of locking nuts could be arranged upon the shaft 102 above the bracket 106 to also control the upper limit for the stroke of the honing head.

Before leaving the construction of the trolley assembly 22, it is further noted that the motor 34 is of a type where the axis of its chuck assembly 36 is offset from the axis of the electric motor 34 itself. Accordingly, an additional tensioning or compensating means (not shown) may be coupled with the motor to compensate for the off-center weight of the motor, chuck and honing head and to maintain vertical alignment of the honing head. The tensioning means might for example comprise a wire spring anchored relative to the inner collar 52 and wound around a rotatable shaft portion of the motor 34 with the opposite end of the wire also anchored to the outer collar 54.

With the vertical reciprocating stroke of the honing head being manually regulated by the lever 24, additional controls are necessary for regulating operation of the motor 34 and for adjusting the flow of honing fluid through the nozzle 30. These controls are arranged in a panel 120 mounted for convenience upon one of the vertical T-bars 44. An ON-OFF control 122 regulates operation of a pump which supplies fluid to the nozzle 30. The panel 120 also includes a signal light 126 which visually indicates when the pump is operating. An infinitely variable solid state speed control 124 regulates the speed of the motor 34. A trigger-type safety switch 128 is mounted on a handle 130 of the lever 24. The switch 128 is spring loaded in a normally off position. The trigger switch 128 must remain depressed to permit operation of the motor 34 under regulation by the speed control 124.

Operation of the honing machine 10 is believed to be apparent from the preceding description. However, the mode of operation for the machine is briefly described below. With the honing head secured to the chuck assembly 36 of the motor, the work piece or engine block 12 is arranged upon the supporting surface 40 of the table as may also be seen in FIG. 3. Preferably, a V-type engine block is supported upon the table by means of the jig 42 to insure vertical alignment of one or more of its cylindrical bores with the stroke of the honing head. A vertical or in-line type engine block would rest directly on the table plate 40 with its cylinder bores in vertical alignment and not require a jig. As may be seen the engine block is arranged with one of its piston cylinders in alignment with the honing head 16. However, the design of the table particularly facilitates movement of the engine block for alignment of any of a number of other cylindrical bores which may be similarly sized by the present honing machine. It is incidentally noted that the honing head 16 may rapidly be interchanged to facilitate rough and finished sizing of bores of different dimensions.

Figure 5:
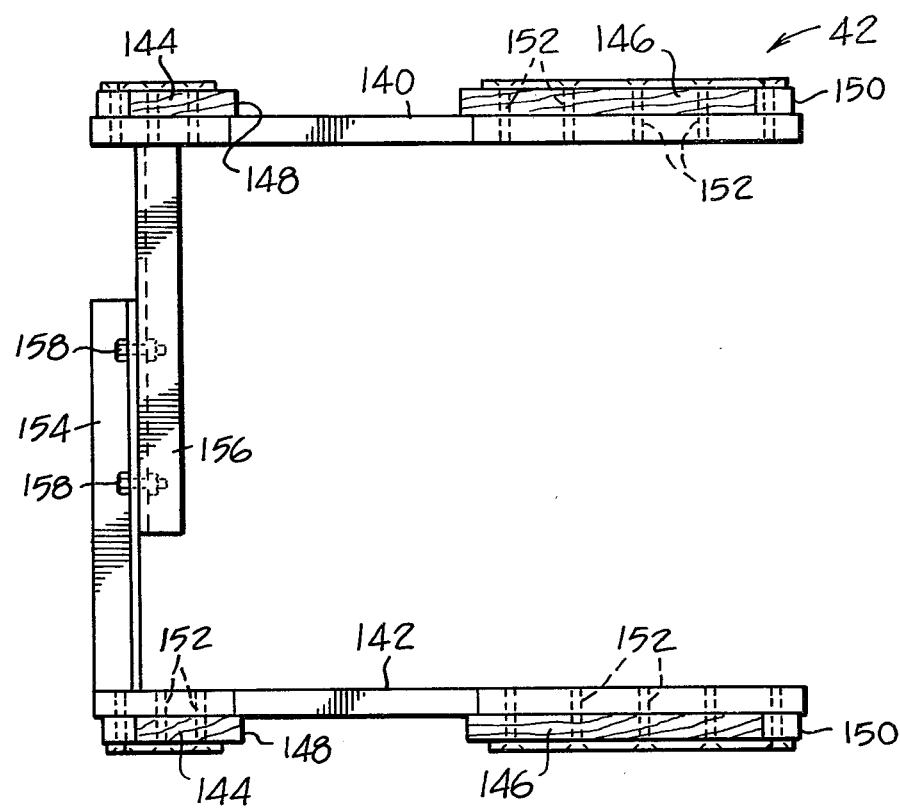
FIG. 5 is a plan view of the jig of FIG. 4.
Figure 4:
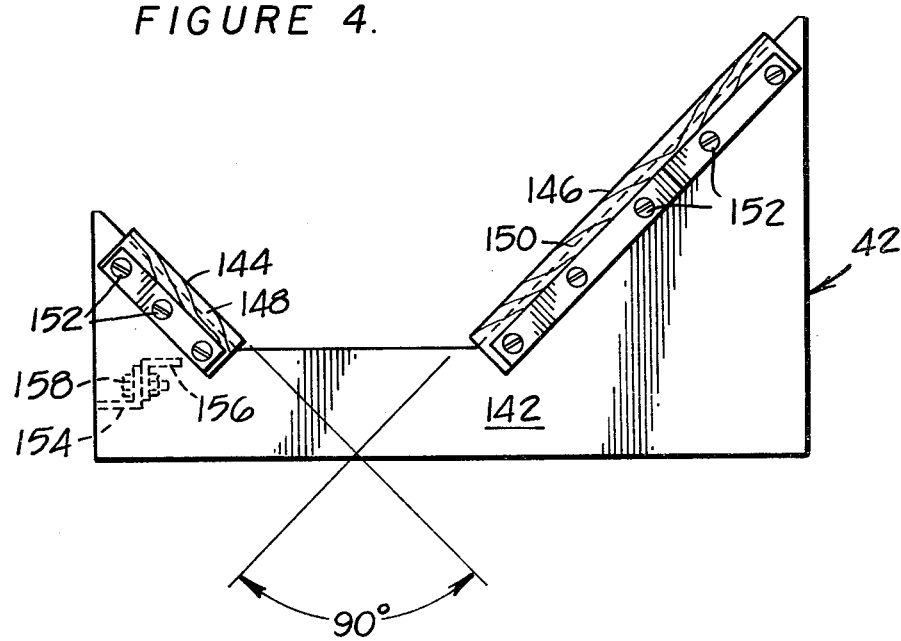
FIG. 4 is a side view of a jig for supporting a V-type engine block on a table portion of the honing machine.

The jig 42 is shown in greater detail in FIGS. 4 and 5. The jig includes matching supports or end pieces 140 and 142. The end pieces each have opposed, inclined support surfaces 144 and 146 preferably forming an angle of 90° with each other. The support surfaces 144 and 146 are formed by wood inserts 148 and 150 which are held in place by screws 152. The wood inserts "grab" edge portions of the engine block and thus securely hold the engine block in any selected position.

Spacing between the end pieces 140 and 142 is established by brackets 154 and 156 respectively secured to the end pieces. The brackets are formed from angle iron and are slidable relative to each other to permit adjustment of spacing between the end pieces. Such adjustment is desirable to avoid protrusions on the engine block from acting on the support surfaces 144 and 146 and interfering firm support for the engine block. The brackets 154 and 156 are secured by set screws 158 to selectively fix the spacing between the end pieces. The arrangement of the brackets along only one lateral side of the jig facilitates operator access for positioning the engine block.

With the proper honing head secured to the motor 34 and the engine block in place, the honing head may then be adjusted as described above to place its cutting stones in contact with the cylindrical surface of the bore 18. The motor 34 then drives the honing head in rotation while the lever 24 is manually operated to vertically stroke the cutting head through the length of the cylindrical bore.

Before commencing the honing operation, the adjustable stop nuts 108 are first positioned upon the shaft 102 in order to set the lower stroking limit for the honing head. This is necessary for example to prevent undesirable contact between the honing head and internal components of the engine block such as webs (not shown) formed in the crankcase portion of the block.

Also prior to commencing the honing operation, the pump within the table is actuated to supply honing fluid through the nozzle 30. The nozzle 30 is preferably of flexible construction as may be best seen in FIG. 2 so that the operator may direct the flow of honing fluid directly onto the honing head.

During the honing operation, it is common practice to frequently interrupt operation in order to measure the instant size of the cylindrical bore. The flexible nozzle also facilitates operation of the honing machine since the nozzle may be merely turned away from the bore during the measuring operation without the need to interrupt operation of the pump. The gimbal suspension of the motor 34 allows the honing head to be withdrawn and moved away from the bore during measuring.

The weight of the counterbalance 28 may also be adjusted in the manner described above in order to exactly balance the weight of the trolley assembly, motor 34 and honing head. In the event that the honing head is replaced, the weight of the counterbalance 28 may be rapidly adjusted in order to compensate for any weight change.

After one cylindrical bore in the engine block is suitably sized or resized, the design of the honing machine facilitates operator access to adjust the position of the engine block with yet another cylindrical bore, such as that indicated at 18' for example in alignment with the honing head. The honing operation may then be repeated in generally the same fashion as described above until all of the cylindrical bores in the work piece or engine block are suitably sized.

Accordingly, the present invention provides a particularly effective and reliable honing machine of relatively simple construction for sizing or resizing cylindrical bores within work pieces such as engine blocks. Various modifications and variations are believed apparent within the scope of the present invention. Accordingly, the scope of the invention is defined only by the following appended claims.

What is claimed is:

1. A manually operable honing machine for sizing a cylindrical bore in a work piece to close tolerance, comprising
    a table having a horizontal surface for supporting the work piece with the axis of its cylindrical bore in vertical alignment,
    a vertical column including two vertical rails arranged on opposite sides of the table with a crosspiece spanning the vertical rails substantially above the table, the vertical column thereby forming an open passthrough above the horizontal surface of the table,
    a trolley arranged for vertical movement upon the vertical rails of the column above the table,
    motor means for operating the honing head, the trolley including gimbal means for supporting the motor means above the horizontal surface of the table, the motor means including a chuck connection with a drive shaft of the honing head, the honing head also including self-aligning gimbal means,
    the gimbal means for supporting the motor means upon the trolley including a first collar secured to the trolley, a second inner collar being pivotally supported from the first collar, the motor means being pivotally supported from the second inner collar in perpendicular relation to the pivotal connection between the first and second collars,
    counterbalance means operatively interconnected with the trolley and the vertical column for counterbalancing the combined weight of the trolley, motor means and honing head,
    a lever for manually raising and lowering the trolley,
    an adjustable fulcrum means, the manual lever and adjustable fulcrum means being interconnected with each other and between the vertical column and trolley for adjusting the reciprocating stroke of the honing head in response to operation of the lever, and
    means for dispensing honing fluid upon the honing head within the cylindrical bore of the work piece.

2. A honing machine for close tolerance sizing of a cylindrical bore in a work piece, comprising
    table means having a horizontal surface for supporting the work piece with the axis of its cylindrical bore in vertical alignment,
    a vertical column including two vertical rails arranged on opposite sides of the horizontal surface of the table means with a crosspiece spanning the vertical rails substantially above the horizontal surface of the table, the vertical column thereby forming an open passthrough above the table means,
    a trolley arranged for vertical movement upon the vertical rails of the column,
    a honing head and interconnected motor means for driving the honing head in rotation, the honing head including gimbal means for enabling it to be self aligning within the cylindrical bore of the work piece,
    gimbal means mounting the motor means upon the trolley for suspending the honing head in general alignment with the cylindrical bore of the work piece, the gimbal means in the honing head and the gimbal means mounting the motor means upon the trolley permitting the honing head to be self aligning within the cylindrical bore,
    the gimbal means for supporting the motor means upon the trolley including a first collar secured to the trolley, a second inner collar being pivotally supported from the first collar, the motor means being pivotally supported from the second inner collar in perpendicular relation to the pivotal connection between the first and second collars,
    means for reciprocally moving the trolley upon the vertical rails in order to move the honing head through the length of the cylindrical bore.

3. The honing machine of claim 1 wherein the means for reciprocally moving the trolley comprises a manual lever and adjustable fulcrum means interconnected between the trolley and the crosspiece of the vertical column.

4. The honing machine of claim 3 further comprising means interconnected with the vertical column for counterbalancing the weight of the trolley and honing head.

5. The honing machine of claim 4 wherein the counterbalance means is adjustable to provide a variable counterbalancing weight.

6. The honing machine of claim 2 wherein the means for reciprocally moving the trolley comprises a manual lever providing a mechanical advantage to facilitate operator control over the trolley and honing head.

7. The honing machine of claim 2 further comprising adjustable stop means operatively interconnected between the vertical column and the trolley to limit the reciprocal stroke of the trolley and honing head.

8. The honing machine of claim 7 wherein the adjustable stop means comprises a threaded shaft and stroke limiting nut operatively interconnected between the crosspiece of the vertical column and the trolley.

9. The honing machine of claim 2 further comprising means for dispensing honing fluid upon the honing head within the cylindrical bore, the table comprising means for collecting the honing fluid.

10. The honing machine of claim 9 wherein the dispensing means comprises a flexible nozzle.

* * * * *